United States Patent [19]

Li

[11] 3,890,690

[45] June 24, 1975

[54] METHOD OF MAKING REINFORCED METAL MATRIX COMPOSITES HAVING IMPROVED LOAD TRANSFER CHARACTERISTICS AND REDUCED MISMATCH STRESSES

[76] Inventor: Chou H. Li, 379 Elm Dr., Roslyn, N.Y. 11576

[22] Filed: May 4, 1972

[21] Appl. No.: 250,195

Related U.S. Application Data

[63] Continuation-in-part of Ser. No. 769,938, Oct. 23, 1968, Pat. No. 3,663,356.

[52] U.S. Cl............... 29/404; 29/191.6; 29/419 R; 29/DIG. 49; 148/127
[51] Int. Cl............................................ B23p 17/00
[58] Field of Search... 29/191.6, 419 G, 404, 419 R, 29/DIG. 49; 148/11.5 R, 127; 161/225

[56] References Cited
UNITED STATES PATENTS

| | | | |
|---|---|---|---|
| 3,084,421 | 4/1963 | McDanels et al............... | 29/419 X |
| 3,098,723 | 7/1963 | Micks........................... | 29/191.6 X |
| 3,165,826 | 1/1965 | Bentov......................... | 29/419 |
| 3,337,337 | 8/1967 | Weeton et al................. | 29/419 X |
| 3,427,185 | 2/1969 | Chealtham et al............ | 29/191.6 X |
| 3,689,328 | 9/1972 | Perona......................... | 29/191.6 X |

OTHER PUBLICATIONS

L. Hjelm, *Metal–Ceramic Composite,* Journal S.A.M.P.E.

H. Wagner, *Fiber–Reinforced Metals,* Defense Metals Information Center, June 24, 1966.

*Primary Examiner*—C. W. Lanham
*Assistant Examiner*—D. C. Reiley, III

[57] ABSTRACT

The method for making reinforced, metal-matrix composite, comprises: preparing elongated, high-strength and high-modulus reinforcing members; dispersing the members is spatial relationship in a strain-hardenable metal matrix; effectively bonding the members to the surrounding matrix at selected, discrete surface regions along their lengths; and stressing the composite sufficiently to locally strain the matrix near the discretely bonded regions. The matrix in the space between the members is then substantially and nonuniformly strain-hardened and strengthened. Also, the spheres of influence induced by the straining and stain-hardening in the matrix near one member are caused to significantly overlap similar spheres of influence near the neighboring members, so as to substantially increase the load transfer ability between the members through the intervening hardened and strengthened matrix.

38 Claims, 4 Drawing Figures

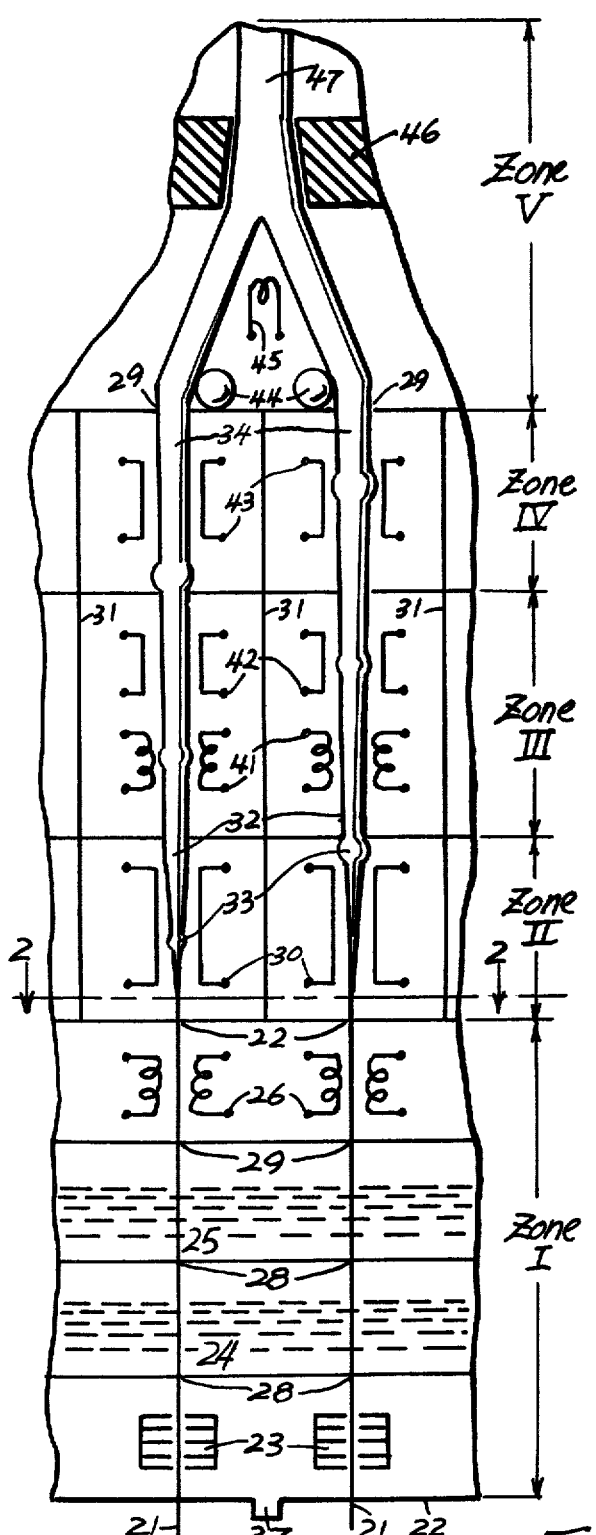
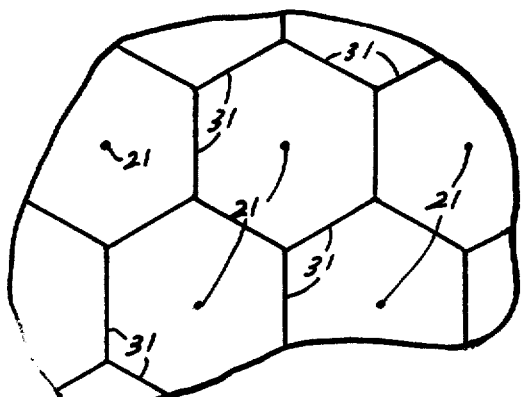
Fig. 2
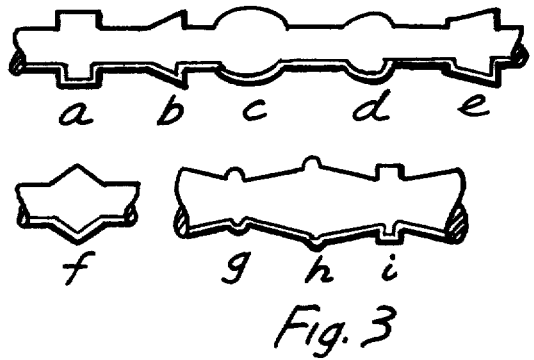
Fig. 3
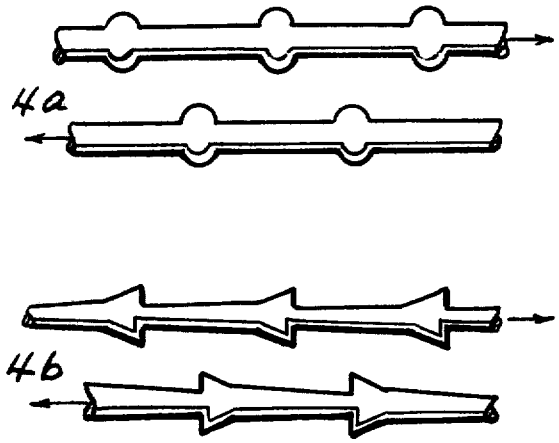
Fig. 4
Fig. 1

METHOD OF MAKING REINFORCED METAL MATRIX COMPOSITES HAVING IMPROVED LOAD TRANSFER CHARACTERISTICS AND REDUCED MISMATCH STRESSES

This is a continuation-in-part of my pending application Ser. No. 769,938, filed Oct. 23, 1968, now U.S. Pat. No. 3,663,356.

The patent relates to a new article of manufacture. This application incorporates all the features of the patent but is restricted to new methods of making and using the article.

This invention relates to reinforced metal-matrix composites and their methods of manufacture, and more particularly to composites comprised of strain-hardenable metal-matrix with elongated reinforcing members dispersed therein and held in position thereby but selectively and differentially bonded thereto.

Laboratory tests have shown that metal-matrix composites, compared with metals, glasses, ceramics, plastics, etc., offer weight saving in aerospace or other structures of up to 45 percent or more. Composites with reinforcing members made of graphite, ceramics, or other refractory compounds promise to have high strengths, high modulii, and long-life high-temperature capabilities. Material scientists have now agreed that composites are not only here to stay, but will become even more important, their uses expanding as rapidly as technologies permit. A list of matrix metals already employed include aluminum, magnesium, titanium, beryllium, iron, copper, silver, molybdenum, and nickel. The materials of the reinforcing members also have varied from boron, beryllium, graphite, sapphire, silicon carbide, boron carbide, to stainless steel.

At least dozens of laboratories are intensively working on these metal-matrix composites. One laboratory has even made titanium composite samples having ultimate tensile strengths of over 147 ksi, compressive strengths of 300 ksi, but not much ductility. Unfortunately, the field of metal-matrix composites is still not very far along. The advances being made so far have been largely empirically based. Different production methods have been used. Such methods include vapor deposition, diffusion or roll bonding, liquid metal infiltration, unidirectional melt growth, powder metallurgy, electroforming, draw cladding, and plasma spraying. But all are beset by major manufacturing problems. The magnitude of these problems has been almost universally considered as insummountable for the next few years.

Foremost among these problems is the difficulty of developing optimum bonding between the matrix and fibers or reinforcing members. The bonding interfaces apparently play a very significant part, if not the key role, in the determination of the resultant composite properties. Thus, observed composite failures mostly occur at or near the matrix-fiber interfaces. It is generally considered that a uniformly strong bonding is essential to the reinforcing mechanism. Too strong bonding, however, appears to render the composite severly limited by the matrix. It is also thought that the fibers must completely wet the matrix (See Wainer: U.S. Pat. No. 3,282,658); yet chemical reactions, interdiffusions, or intermetallic compound formations often occur when they do wet, resulting in severe chemical degradations or even destructions of the reinforcing fibers.

Another problem with most present composite manufacturing processes is improper and inconsistent fiber alignment. Yet alignment of discontinuous fibers is very important in achieving high tensile strengths, particularly at high temperatures. Misalignment of only 3° causes significant decreases in tensile strengths, particularly when short or discontinuous fibers are used.

A third serious problem is the physical or chemical degradation of the fibers. It is not unusual for the extracted fibers to lose over 50 percent of their tensile strengths. Because the fibers are very fine in diameters, they have very little cross-sectional areas and are, therefore, easily broken under transverse shears, such as are necessarily present in powder metallurgy, rolling, or other mechanical operations. Also, the diffusion rates, which govern many pertinent chemical reactions or brittle intermetallic compound formations, are often large compared to the fiber diameters, so that even within the processing time severe, localized or general penetration may result. Examples of such chemical degradations have been repeatedly observed. Slight interactions on sapphire fibers, for example, have shown to significantly reduce their strengths. Also, silicon carbide fibers are easily and completely dissolved in nickel matrices, though not in aluminum. In other cases, intermetallic phases form and grow at the fiber-matrix interfaces. The ductilities of the composites are then markedly reduced by the brittle compounds and surface irregularities on the fibers that result from such reactions. The composite strength is, of course, directly related to the unreacted fiber volume portion.

The control of fiber distribution in the composites persents another major problem. In the melt growth processes, the fibers tend to sink or float in the melts, or even be unpredictably disturbed by convection currents in the melts. Fibers also tend to segregate toward the surfaces during hot pressing, and to be fragmented near the surfaces during hot rolling. Yet to obtain optimum strength, the geometry, orientation, and volume percentage of the fibers must be carefully controlled.

As described in the abstract of this specification, the invention relates to the structure of, and method and equipment for manufacturing, reinforced metal-matrix composites. The new composite comprises a strain-hardenable metal matrix, and a plurality of high-strength, high modulus, elongated reinforcing members dispersed therein and held in position thereby. The dispersion of the members in the matrix is in a preselected spaced arrangement and at least a major portion of the members is each bonded effectively to the surrounding matrix differentially along its length. Differentially bonded regions on each such member selectively though non-uniformly strain and strain-harden the surrounding matrix upon the application of external load on the composite, so as to substantially increase the efficiency of physical interaction and load transfer between the members through the intervening hardened and strengthened matrix. The method comprises preparing the requisite elongated reinforcing members, dispersing the members in a strain-hardenable metal matrix according to a preselected spaced arrangement, and selectively bonding the members to the matrix.

The objects of the invention are:

1. To overcome the aforementioned manufacturing problems and disadvantages of prior-art composites comprised of the usual high-strength, high-modulus reinforcing members embedded in the usual strain-hardenable metal matrices;

2. To achieve reproducible alignment and distribution of the reinforcing members in the composites;

3. To provide improved reinforced, metal-matrix composites;

4. To obtain optimum combination and structure of physical and chemical bonding between the matrix and fibers, for controlled load-transfer characteristics between the fibers and for improved overall performance of the composites;

5. To provide means to control the chemical bonding, reaction, or diffusion between the fibers and the matrix so as to reliably achieve high composite strength;

6. To provide unique, transverse protrusions or ridges on the reinforcing members to achieve novel, and useful physical and/or chemical results;

7. To control and relieve mismatch stresses and strains between the matrix and the fibers;

8. To provide means to increase the resistance of the fibers to transverse dynamic stresses and strains;

9. To improve the life and reliability of high-temperature metal-matrix composites; and 10. To disclose novel processes and equipment to manufacture composites having the above-described desirable properties.

Further objects and advantages of my invention will appear as the specification proceeds.

The preferred form of my invention is illustrated in the accompanying drawings in which:

FIG. 1 is a front view showing a portion of the inside of a composite-making apparatus according to the invention;

FIG. 2 is a top view of the above apparatus taken along the cross-sectional line 2—2 of FIG. 1;

FIG. 3 shows the presence of protrusions or ridges, and their various shapes, on the reinforcing members; and FIG. 4 shows the arrangements of the reinforcing members with their associated protrusions thereon for obtaining optimum reinforcing effects in the composites.

With reference to the drawing, there is shown in FIG. 1 one form of the apparatus for producing the metal-matrix composites according to the method of the invention. Here, a number of parallel, fine tungsten, tantalum, or other supporting wires 21 are arranged by means of guides 22 in a substantially uniform and equispaced, triangular or hexagonal pattern, such as is seen in FIG. 2. Non-metallic supporting wires are often equally useful. Metallic wires, however, are generally easier to handle and, further, allow the passage of electrical currents therein for heating or electroplating. These wires are pulled from their respective spools (not shown) at their lower ends vertically upward at fairly uniform speeds to pass through a number of processing zones, i.e., Zones I to V, as shown. The preferred vertical movements eliminate gravity effects and result in symmetrical and uniform deposits or surface treatments to be discussed.

Zone I is for wires preparation and may include such processing steps as mechanical cleaning by brushes or scrubbers 23, chemical cleaning including degreasing by organics 24 and oxide removal by acids 25, and vacuum cleaning such as vacuum heating by heaters 26 and/or ion bombardment. It is evident that suitable dust removal means or ducts 27, liquid seals 28, vacuum locks 29, fluid inlets and outlets, instruments, heating and pressurizing means, etc., must be provided for these operations.

Zone II is for depositing the reinforcing metallic or non-metallic materials 32. The depositing method used here is chemical or vacuum vapor deposition from suitable sources 30, although it may also be electroplating or another method such as pulling the supporting wires through a bath of suitable molten materials. For a specified reinforcing material 32, skilled persons can readily select the appropriate deposition methods and estimate the optimum processing conditions. Preferably, each wire has its own deposition chamber, such as is outlined by partitions 31, so that the deposition thereon can be adjusted and controlled independently of the deposition on the other wires. According to one aspect of the invention, the depositing conditions are periodically changed, such as by varying the degree of energization on the sources 30, or, in other cases, the plating or heating currents in the supporting wires, or the deposition temperature and chemicals concentrations in the deposition chambers. These periodic changes in deposition conditions cause periodic variations in the deposition rates resulting, at constant supporting wires traveling speed, in transverse protrusions 33 being regularly and purposedly formed on the wires. The shape, size, and portion of these protrusions on each wire can be independently programmed and controlled in a predetermined manner, account being taken of the shape, size, and position of similar protrusions on the neighboring wires. For most uses, these protrusions should be equal in size and shape but zigzag from one wire toward its neighbors along a longitudinal direction of the wires, as is shown in FIG. 1. After passing through the deposition zone, or Zone II, the wires become reinforcing, threadlike fibers, being covered thereon with the required amount of reinforcing materials 32, such as B, Be, SiC, sapphire, graphite, and the like.

In Zone III, the reinforcing fibers receive their post-deposition treatments, which may be simply a rinsing treatment after electroplating, or vacuum and/or thermal degassing, or, as shown, heating by heaters 41 to promote diffusional bonds between the supporting wires 21 and deposited reinforcing materials 32. The fibers may also receive other special treatments in Zone III. For example, in one such treatment, the reinforcing fibers are passed through sponges of proper sizes and elasticity and in proper spaced arrangement and, furthermore, wetted with a solution of chemical bond-promoting materials to improve the chemical bonding between the matrix and the reinforcing materials 32. A metallizing solution of molybdenum or tungsten oxide, for molybdenum molybdenym trioxide, is particularly useful for promoting chemical bonding to metal matrices by many ceramic reinforcing fibers such as sapphire, beryllia, and graphite, or by many metallic reinforcing fibers (such as Ti or stainless steel) having non-metallic oxides or other refractory materials on the surfaces. It is to be noted that these chemical bond-promoting materials are applied only to the protruded portions of the reinforcing members by the sponge technique described above. On fibers without protrusions, these chemical bond-promoters may be applied to selected portions on the fibers by, e.g., periodically compressing the wet sponges against the fibers, or by using suitable sources 42 of the bond-promoting materials together with masks, shutters, or programmed periodic source energizers. Greases, oils, or other special materials contained in these same sponges or sources may also be applied as masks or shields only to selected portions so that only portions between these selected portions are now susceptable to a subsequent treatment. This treatment may comprise applying a surface layer by chemical reaction or electrodeposition to prevent wetting and to reduce chemical bonding between the matrix and the non-protruded portions. Another post-deposition treatment in Zone III may be to apply, either selectively or uniformly, a soft, metallic Cu, Ni, or Al cushioning surface layer of substantial thickness to increase the resistance of the reinforcing members to transverse and dynamic stresses and strains.

The reinforcing fibers prepared in the above manner may be used as such according to conventional fiber-matrix integration techniques, such as pressing, liquid infiltration, extrusion, and the like. However, according to another aspect of the invention, the reinforcing members or fibers coming out of Zone III are passed directly into Zone IV for the application, as a part of a continuous process, of the relatively soft and plastic but strain-hardenable metal matrix 34 (such as the usual Al, Mg, Ti, Be, Fe, Cu, Ag, Ni, Mo mentioned before) thereon, by liquid penetration, electroplating, vapor or vacuum deposition, such as from the sources 43 as shown. Special shields, and liquid, vapor, or vacuum locks, matrix metal sources, etc., may be required here, but these are also easily designed by persons skilled in the art.

By using special matrix metal sources, masks or shields, deposition control means, the matrix-coated reinforcing fibers may come out of Zone IV as smooth or fairly smooth-surfaced rods. However, according to another aspect of the invention, these rods are purposedly to have substantially enlarged nodules corresponding to the protrusions 33 on the reinforcing fibers. These enlarged nodules achieve the following results. Firstly, they facilitate zigzagging the protrusions from one reinforcing member to its neighbors when these fibers or members are densified. Secondly, they allow regulated pre-straining of the metal matrix between the protrusions or nodulus during the composite compaction process. Thirdly, the nodules achieve much greater strain-hardening in the matrix close to them than otherwise possible, while still retaining softness or ductility in other portions of the matrix distant from the nodules. By regulating the shape, size, and spacing of the protrusions or nodules on the reinforcing members, and the thickness of the matrix metal thereon, the strain-hardening effect can be maximized.

The last zone, i.e., Zone V, is for final preparation, which may include such steps as mechanical or chemical cleaning of the matrix-deposited reinforcing members; densification by extrusion or pressing; thermal treatments (for degassing and controlling the grain-size of the matrix or fiber material, or for promoting bonding only at selected areas between matrix and reinforcing fibers); conditioning the composite including strain-hardening selective portions of the matrix; packaging; and the like. In FIG. 1, the reinforcing fibers with the matrix metal vacuum-deposited thereon from the deposition sources 43 are seen to be guided by guides 44 to pass through a heating zone by heaters 45 into densifying die 46. Finished composite 47 then comes out of the exit end of the densifying die 46. This densifying die may be simply an extrusion die.

In summary, in the preferred mode described above, metallic or non-metallic supporting wires 21 are prepared in Zone I of the equipment of FIG. 1 by mechanical, chemical, and vacuum-thermal means. The prepared wires then enter into Zone II for deposition of the reinforcing material 32, and preferably also for formation of the spaced protrusions 33 thereon at the same time. Zone III is for such post-deposition treatments as rinsing, vacuum degassing, or thermal treatments. Another useful treatment is the application of soft cushioning layer, or a chemical bond promoting or reducing layer by a sponge technique. Zone IV is for the deposition of the matrix metal 34 on the reinforcing member. The "final preparation" Zone V may be designed for cleaning, densifying, heating, conditioning, packaging, and/or the like.

It can be seen that the above scheme completely solves the persistent problems of improper fiber alignment and distribution. Each reinforcing fiber now has exactly six closest neighbors in the above scheme at substantially the same distances apart. This results in substantially balanced transverse forces on each fiber from its neighboring fibers, thereby avoiding fiber breakage. It also avoids, on the one hand, too much spacing between reinforcing fibers so that the efficiency of mechanical interaction or load transfer between them is impaired or nullified and, on the other hand, too closely-spaced fibers so that the full strain-hardening effect of the matrix surrounding the fibers is not achieved thereby resulting in failure of the intervening matrix because of localized high stresses and strains. Full strain-hardening of the matrix, according to this invention, is achieved when there are present therein large, controlled and regularly-spaced, and preferably uniformly-shaped strain-hardened zone of continually increasing straining intensity toward the chemically bonded portions on the fibers.

The protrusions 33 which are purposedly introduced in the above case, or the chemically-bonded portions selectively arranged as the protruded or non-protruded fibers, enable each such fiber to be bonded effectively to the surrounding matrix differentially along its length to selectively and differentially strain and strain-harden the surrounding matrix upon the application of external load on the composite, so as to substantially increase the efficiency of mechanical interaction and load transfer between the fiber and its neighbors through the intervening hardened and strenghtened matrix. The less strained matrix between these strain-hardened portions remain relatively soft and plastic to allow therein some stress and strain adjustments or energy absorption under the load, thereby preventing microcracks from forming or growing and hence reducing composite failures.

It is to be particularly noted that in the above example, the bonding between each fiber and its surrounding matrix varies in a systematic, predetermined manner periodically along the length of the fiber, the periodic distance being determined by the distance between two neighboring, similarly bonded portions on the fiber or, in the case of protruded fibers, the distance between two neighboring protrusions on the same fiber.

Preferably, each of the fibers is at least partly chemically bonded to the surrounding matrix to prevent complete boundary separation between the fibers and matrix. Yet complete and uniform chemical bonding, though specified, taught, or implied in prior-art composites, is neither necessary nor desirable. This is not only because effective load transfer between fibers can be achieved without complete chemical bonding, but because the matrix and fibers can never be exactly matched, both statically and dynamically, in thermophysical properties. Complete chemical bonding between the matrix and fibers, therefore, inevitably results in build-up of substantial mismatch stresses and strains, and often leads to premature failures during services, particularly under dynamic, mechanical or thermal loading conditions. On the other hand, imperfect chemical bonding at wellchosen or selected portions, such as on the non-protruded portions of protruded fibers, though against ordinary use and teaching, relieves such substantial mismatch stresses and strains and actually improves the overall performance and reliability of the resultant composites. Mere physical bonding is often enough between the chemically bonded discrete regions so that in this case the bonding between each fiber and its surrounding matrix is alternately chemical and physical in character along the fiber.

As indicated above, a well-known problem in present composite making is fiber degradation through physical breakages and/or chemical reaction or diffusion between the matrix and fibers. The soft plastic, metallic cushioning layers on the fibers previously described are specifically designed to minimize physical breakages. According to yet another aspect of the invention, on selected portions of the fibers where perfect chemical bonding is not required, an inert surface layer is purposefully applied, as mentioned previously. An example of such an inert surface layer is titanium carbide layer on titanium fiber, to prevent the diffusion of matrix iron thereinto.

Composites according to the above invention can be achieved with reinforcing fibers having, or having no, transverse protrusions thereon. When no protrusions are needed, the same manufacturing procedures described previously in connection with FIG. 1 may be employed, except that there are then no periodic variations in the deposition conditions for the reinforcing materials 32 and that the fibers come out of Zone II roughly as smooth-surfaced threadlike reinforcing fibers.

However, the protrusions achieve many novel and important purposes: Firstly, they effectively strain and strain-harden the surrounding matrix, thereby raising the load that can be transferred between the fibers through the intervening strenghthened matrix. This achieves a new and useful result, which is particularly evident in the matrix located among oppositely compressing or shearing protrusions on neighboring fibers (See FIG. 4). Secondly, the protrusions facilitate and simplify the regulation and control of differential bonding between the matrix and fibers, described above as an essential feature of my new mode or principle of composite reinforcing mechanism. Thirdly, the protrusions prevent the reinforcing members from being pulled out of the composite, particularly at high temperatures. Fourthly, the protrusions provide bearing areas so that the load transfer between fibers are not limited to interfacial shears that tend to break the fiber-matrix bonds, but also at least partly taken up by compressions, to which the matrix has much greater resistance to failure than shear. Finally, according to another aspect of the invention, only surfaces of the protrusions on the fibers are chemically bonded to the matrix, so that the non-protruded portions on the fibers are prevented from chemically reacting or diffusing with the matrix. In general, such chemical reactions or diffusions follow well-known diffusion laws so that for a given system under a specified service (temperature) conditions, the time to penetrate a given depth is roughly proportional to the square of the diameter. Since the protruded portions have diameters of, typically two to three times the fiber diameter, the time to penetrate and fail at the protruded portions is about four to nine times greater than at the non-protruded portions. That is, by having protrusions on the reinforcing fibers and limiting chemical bonding only to the protruded portions, the high-temperature life of the composite will often be increased manyfold.

The protrusions should generally have no sharp edges or corners that may act as stress raisers. Each of the protrusions may have a shape symmetrical with respect to a plane normal to the fiber, or have no such symmetrical shape with respect to every such plane. In some cases, protrusions having non-symmetrical shapes are desirable so that the load transfer efficiency from one fiber to its neighbors in one of the longitudinal directions is substantially higher than that in the other direction. It is also desirable to have the direction of high load transfer efficiency alternate from one fiber to its neighbors, such as is shown in FIG. 4b with the tensile forces indicated thereon. These arrangements achieve the oppositely compressing and shearing, and the resultant great strain-hardening, effects on the matrix.

The protrusions should not be too large in sizes because then the thin fibers are frequently subjected to large bending stresses from loads applied on the flanges of the protrusions. Neither should the protrusions be too small, or the beneficial effect of protrusions is not fully exploited. For optimum results, these protrusions should have diameters of about 1.5 to 6 times those of the fibers. Since each protrusion must optimally interact not only with protrusions on neighboring fibers but also with those on the same fiber, the spacing of the protrusions on the fiber should be less than 3 or 15 times protrusion diameters, otherwise such interactions become negligible or insignificant. On the other hand, too closely spaced protrusions on the fiber, such as less than three times protrusion diameter, result in too small and insufficiently developed strain-hardened zones in the matrix. For similar reasons, the spacing between nearest protrusions on two neighboring reinforcing fibers in the composite should roughly be between 3 to 10 times protrusion diameter for optimal results, being also somewhat dependent on the height of the protrusions relative to the fiber diameters. The best size of protrusions, or spacing between protrusions or fibers, varies from instance to instance, being also dependent on the strain-hardening behavior of the matrix.

The optimal volume percentage of reinforcing fibers can be determined according to the following rule to achieve optimal strength by insuring equal failure rates in the fibers and in the surrounding strain-hardened matrix. Thus, the effective area of the hardened and strengthened matrix in the strain-hardened zone surrounding the fiber (at the chemically bonded or protruded portions) multiplied by the ultimate tensile strength of the strain-hardened matrix should equal the cross-sectional area of the reinforcing fibers, or at the non-protruded portions thereon if protrusions are present, multiplied by the ultimate tensile strength of the fibers.

Each of the reinforcing fibers in the above example comprises a metallic or non-metallic wire core 21 for support, and an outer layer of the reinforcing material 32. This material may have the same composition as the core so that the boundary between the core and the outer layer may be physically or chemically indistinguishable. If, in addition, the core material is single-crystalline, under suitable growth conditions (See Li, Physica Status Solidi 15, 3, 1966), the outer layer can also be made single-crystalline and cyrstallographically indistinguishable from the core, thereby resulting in single-crystalline fibers.

Even commercially available fibers or other reinforcing members may be used to practice this invention. These fibers may be of AlN, $Al_2O_3$, Ba, B4C, Be, BeO, C, graphite, Mo, SiC, $Si_3N_4$, Steel, $TiB_2$, TiC, TiN, W, WC, zirconia. These fibers, selectively surface-contoured to provide the protrusions thereon (by, e.g., stamping, machining, etching), and/or coated with bond-affecting chemicals (such as Cr and Ca, Sr, Ba, or Mg of Wainer in U.S. Pat. No. 3,282,658), are fed directly into Zone IV or V of the equipment of FIG. 1, thereby simplifying the equipment by eliminating the Zones 1 to III or IV. Schmeckenbecher's fibers (U.S. Pat. No. 2,978,323) comprising Fe and Ni wires carbonyl surfaces coated with B, Ti, Si, P, As, may be similarly treated and used here. Gruber's pure SiC fibers (U.S. Pat. No. 3,246,950) prepared by gaseous reaction of silicon monoxide and carbon monoxide, preferably between 1300°–1600°C, can also be treated according to this invention for incorporation into Al, Fe, Co, Ni, W, Mo matrix materials by powder metallurgy or other techniques.

The metal matrix material 32 may be selected from a long list including: Ag, Al, Cu, Co, Cr, Fe, Mg, Mo, Ni, and their alloys such as 19 (w/o) Cr-9(w/o) Ni-F3, 67 Co-31 Cr, 13 Co-15Cr-15Ni-51 Fe, 13 Co-25 Cr-16 Ni-Mo, etc. Such materials may be chemically deposited (See Brenner in U.S. Pat. No. 2,842,468), vacuum evaporated, or electroplated. Even Al can be electroplated by means of a diethyl ether solution of aluminum chloride and lithium aluminum hydride (See J. Electrochem. Soc. 99, 6, 1952).

Single-crystalline fibers or whiskers can also be grown without the use of core wires at all. This has been done by unidirectional eutectic melt growth (See Kraft's $Al-CuAl_2$ and $Cr-Cr_{23}C_6$ in Trans. AIME 221,95, 1961 and 227,380, 1963; or Kraft U.S. Pat No. 3,124,452; Weiss U.S. Pat. No. 3,226,225 and 3,267,405; Lemkey U.S. Pat. No. 3,434,827; Heimke U.S. Pat. No. 3,434,892; and Müller U.S. Pat. No. 3,442,823). Another method comprises nucleating with, e.g., a special catalytic impurity vacuum-deposited on a substrate according to a hexagonal pattern; growing the whiskers by chemical or vapor depositions, from chemical solutions, by electroplating, or otherwise such as by the vapor-liquid-solid growth mechanism (See Li, Phys. Stat. Solidi 15, 445, 1966); and possibly even keeping the whiskers aligned by mechanical pulling or electrostatic means.

In the equipment of FIG. 1, the method of manufacturing the metal matrix reinforced composite involves three distinct steps, i.e., preparing the fibers, dispersing the fibers in the matrix, and selectively bonding the fibers to the matrix. In melt eutectic growth, these three steps are simultaneously achieved in a single operation. Some other controlled chemical phase transformations, such as peritectic, monotectic, or eutectoid reactions of metals can be similarly useful. These chemical phase transformations involve in each case three distinct phases capable of establishing thermo-dynamic equilibrium at a transformation temperature. The phase transformation is to occur at this transformation temperature, and at least one of the three phases preferably is a liquid or gaseous phase so that the transformation is not limited by the slow solid diffusions.

One can even produce lateral protrusions desired on the eutectic fibers or sheets for this invention by reducing the growth temperature and/or growth rate, suddenly, in accordance to Hanson (U.S. Pat. No. 2,988,433), Dermatis (U.S. Pat. No. 3,162,507), Bennett (U.S. Pat. No. 3,031,403), or Sirtl (U.S. Pat. No. 3,344,002). Sirtl achieved controlled thickening of dendrite ribbon shaped monocrystals of III–V or II–VI compounds and simultaneous doping by changing growth temperature, temperature gradient, or concentration gradient. The doping agent can be selectively segregated at discrete regions on the reinforcing fibers or sheets, in accordance to their segregation coefficients, so as to selectively affect the matrix bonding properties at these regions. The segregated doping agent, if preferably oxidizable over the matrix metal, e.g., Al over Fe or Ni, will reduce the bonding strength at these regions or to prevent chemical bonding altogether thereat. Thus, in melt eutectic growth with sudden and periodic variations in melt temperature, withdrawal rate, or temperature gradient, we can not only produce protrusions and achieve differential chemical bonding, but to position the selectively bonded discrete regions relative to the protrusions. The procedure involves adding to the original melt a chemical bond-promoting or bond-inhibiting, melt-segregatable impurity and allowing the impurity to segregate on the protrusions or other selected portions of the melt-grown fibers or sheets. Care should be taken to adjust the growth conditions in relation to eutectic solidification and impurity segregation, as determined by the relevant phase diagrams.

FIG. 3 shows three basic forms or shapes of the protrusions or ridges on the reinforcing members. These forms are: square wave 3a, triangular wave 3b, and ellipitcal wave 3c. These forms can also be distorted, e.g., the distorted partial ellipase 3d and distorted square 3e. The last form 3e can also be considered as a combination of the square and triangular forms. Other combination forms include two oppositely tapering or triangular forms 3f, tapering with superposed ellipse 3g and 3h, and tapering with superimposed square 3i.

FIG. 4 shows two arrangements whereby neighboring reinforcing members of the protruded type are arranged to achieve oppositely compressing and/or shearing effects on the intervening matrix. When a reinforced composite of this invention is loaded, some pairs of neighboring members must be oppositely tensioned, and the situation depicted in or similar to FIG. 4 always results. FIG. 4a is a useful arrangement in which the load-transfer efficiency is independent of the direction of the tensile forces, i.e., whether as shown or oppositely directed. On the other hand, in the arrangement of FIG. 4b, the same efficiency depends on the direction of tensile forces on the reinforcing members. Notice that here these members have combination protrusions, i.e., triangular protrusions on tapering bases. Further, for each member the direction of easy load transfer on the triangular protrusion is directly opposite to that for the tapering base. Specifically, the triangular protrusions cause the top member of FIG. 4b to have high load transfer efficiency if this member is pulled to the right as is indicated, but the tapering base has low load transfer efficiency for the same pulling force on the same top member of FIG. 4b.

When a composite with protruded members dispersed therein is subjected to stressing including mechanical working, such as rolling or extrusion, differential bonding between the members and matrix occurs. Further, such mechanical operations can be regulated so that the character and degree of bonding, and the shape, size, and spacing of the bonded portions can be controlled and programmed. Also, not only is the bonding better and more chemical in the protruded portions than in the non-protruded portions but, on the same protrusion, the side first coming out of the rolling or extrusion die is better bonded than the other side. When the mechanical working or area reduction is sufficiently severe, such as between 40 to 100 percent of the allowable straining and strain-hardening without failing the matrix; and when the straining is sufficiently rapid, i.e., if the rolling or extruding speed is comparable with or exceeds the thermal diffusion rate in the matrix, then substantial chemical bonding results from the almost adiabatic heating by heat converted from the plastic deformation work. The composite with protruded reinforcing members dispersed therein and coming out of the extrusion die 46 of FIG. 1 can, therefore, be selectively and differentially bonded, either physically or chemically, in respect to the bonding between the members and matrix, if suitable processing procedures are adopted. However, if the reinforcing material 32 or matrix metal 34 is easily or heavily oxidized, then special chemical bond-promoters are desirable to insure positive bonding.

Even with the extruded or rolled composites containing nodulated members, differential bonding is further intensified upon application of load on the composite. Rolling and extruding do strain-harden and strengthen the matrix metal around the nodules or protrusions, but according to a different type of force system and resulting in a different spatial straining pattern. This is because the forces in rolling and extrusion are predominantly lateral, rather than longitudinal as usually occurs during service of the composites. That is, the extruded or rolled composites containing nodulated reinforcing members go through additional processes of matrix differential straining and strain-hardening, upon load application on the composites.

It is to be reemphasized that composites according to the present invention achieve high load-transfer efficiencies between the reinforcing members and matrix through controlled, selective and differential straining and strain-hardening of the matrix, a natural result of regulated, selective and differential bonding between the matrix and the reinforcing members dispersed therein. Such a reinforcing mechanism is completely different from those involved in fiber glasses or reinforced concretes. In these materials, the matrix is not strain-hardenable and, in contrast to the composites herein disclosed, merely acts as glue in fiberglasses while carries practically all the load in reinforced concretes. In both these cases, the load transfer between the reinforcing members is limited by the low shear strengths of the unchanging, relatively weak matrices. Further, reinforced concrete cannot stand high temperatures and thermal or mechanical shocks, largely because there is no soft matrix regions for the absorption of thermoplastic mismatch stresses and strains. Also, in reinforced concrete with ribbed steel rods, the stresses are highly concentrated at only a few protruded areas, again because of no matrix yielding. On the other hand, in my new composites, external service load is successively and gradually taken up by increasingly strain-hardened individual or discrete matrix regions, until all such regions (in the space between protrusions on neighboring members) are assuming nearly equal shares of the load. The localized stresses cannot exceed the matrix yield stress because of selective matrix yielding. Such a self-regulated, load or stress distribution is absent in any of these materials.

Even prior-art composites of the metal-matrix type greatly differ from my composites in structure, result, and mode of operation, because the former lack controlled and optimum strengthening of the matrix, protrusions on the reinforcing members, regulated differential bondings, alternate chemical and physical bondings, intentionally imperfect chemical bondings at periodic intervals to relieve mismatch stresses and strains, and the like.

All fibers or sheets in existing metal-matrix composites are not smooth; some even have uncontrollable and undesirable surface roughnesses. Still, the bondings of these members to the matrix are neither selective nor controlled. The bonded regions are neither substantially equal-spaced, nor similar-shaped, nor zigzagging on neighboring members. Above all, the transverse thickness variations in these members are not sufficiently great, i.e., less than 50 percent of the minimum thickness of the member, and the protrusions are of improper shape and spacing. The result is that the metal matrix is not substantially strain-hardened and strengthened, and the spheres of influence because of the straining and hardening do not significantly overlap to achieve substantially increased mechanical interaction and load transfer ability, even if these member otherwise completely followed the principle of this invention.

It is to be particularly noted that in my composites the load transfer is not directly from one reinforcing member to another, but indirectly through the intervening strain-hardened and strengthened matrix. Further, the strain-hardening and strengthening in the matrix is not abrupt (such as is obtained by many other methods of composite manufacture such as soldering, brazing, and spot welding the fibers together), but gradually varies in intensity, both laterally and longitudinally, reaching maximum values at near the centers of the chemically bonded matrix-member interfaces. Also, the matrix metal is alternately hard and soft along the length of each discretely bonded member, hard where strength is needed to insure efficient load transfer from member to member while soft where some ductility is required to allow stress and strain relief.

The invention is not to be construed as limited to the particular forms disclosed herein, since there are to be regarded as illustrative rather than restrictive. Thus, while it is possible to achieve most or all of the ten objectives of the invention with the equipment and process disclosed herein, merely applying the differential bonding principle of composite reinforcement allows one to achieve a few of the stated objectives (e.g., high load transfer, great strength, high temperature capability), simultaneously and with either nodulated or non-nodulated reinforcing members. Also, composites may have only a portion of the reinforcing members differentially bonded to the matrix, to achieve partial benefits.

What is claimed is:

1. The method for making reinforced, metal-matrix composite, comprising: preparing a plurality of elongated, high-strength and high-modulus reinforcing members; dispersing the members in spatial relationship in a strain-hardenable metal matrix; effectively bonding the members to the surrounding matrix at selected, discrete surface regions along their lengths; and stressing the composite sufficiently to locally strain the matrix near the discretely bonded regions whereby the matrix in the space between the members is substantially and selectively though nonuniformly strain-hardened and strengthened and whereby spheres of influence induced by the straining and strain-hardening in the matrix within the space near the discrete regions on one member are caused to significantly overlap similar spheres of influences near the neighboring members so as to substantially increase mechanical interaction and load transfer ability between the one member and the neighboring members through the intervening hardened and strengthened matrix.

2. The method of claim 1 wherein the bonding step comprises varying the character of bonding periodically along the length of the members.

3. The method of claim 1 wherein the bonding step comprises alternately chemically and physically bonding the matrix to the members along their lengths.

4. The method of claim 1 wherein the members have appreciable, difficult-to-wet surface materials thereon, and the preparing step includes applying a bond-promoting chemical on selected surface areas of the members, the selected areas generally coinciding with the subsequently formed, discretly bonded regions.

5. The method of claim 1 wherein the preparing, dispersing, and bonding steps are accomplished in a single operation by means of a chemical phase transformation involving at least three distinct phases capable of establishing thermodynamic equilibrium at a transformation temperature, the transformation occurring at the temperature and the three phases including at least one fluid phase at the temperature.

6. The method of claim 1 wherein the preparing, dispersing, and bonding steps are accomplished in a single operation by means of eutectic melt growth.

7. The method of claim 1 wherein the bonding step comprises effectively bonding to the matrix at substantially equally spaced and similarly shaped discrete regions along the length of each of the members.

8. The method of claim 7 wherein the dispersing step comprises orienting the members generally in the direction of the intended principle tensile loading on the composite when in use.

9. The method of claim 1 wherein the preparing step comprises periodically and substantially varying the transverse section thickness of each of the members along its length.

10. The method of claim 9 wherein the periodic transverse thickness variation includes within each period a transverse plane of substantially constant but extreme section thickness, and wherein the bonding step comprises bonding to the matrix the members in discrete regions generally centered on the planes.

11. The method of claim 1 wherein the preparing step comprises periodically forming along the length of the members protrusions having sufficient sizes to significantly affect the spheres of influence.

12. The method of claim 11 wherein the bonding step comprises limiting the chemical bonding of the matrix to only the surfaces of the protrusion.

13. The method of claim 11 wherein the bonding step comprises bonding to the matrix the non-protruded portions of the members imperfectly to the extent to allow absorption therein of thermoplastic mismatch stresses and strains between the members and the matrix.

14. The method of claim 11 wherein the preparing step comprises applying on each non-protruded portion of the members a protective inert layer to prevent the portion from chemically bonding to and reacting with the surrounding matrix.

15. The method of claim 11 wherein the maximum lateral dimension of the protrusions is between 1.5 to 6 times the minimum lateral dimension of the members and the protrusions are separated on each said member at distances of from 3 to 15 times the maximum lateral dimension.

16. The method of claim 11 including independently controlling the shape, size, and position of the protrusions formed on one member relative to those of similar protrusions on neighboring members so that the protrusions are substantially of similar shape and equal size and equally spaced on each member; but zigzag from one member toward its neighboring members along a longitudinal direction thereof.

17. The method of claim 16 wherein the distance between two nearest protrusions on neighboring members is between 3 to 10 times the maximum lateral dimension.

18. The method for increasing mechanical interaction and load transfer ability between elongated, high-strength and high-modulus reinforcing members surrounded by a strain-hardenable metal matrix in a composite, comprising, dispersing in the matrix the members in a generally parallel, spatial relationship relative to one another; effectively bonding the members to the surrounding matrix at selected, discrete surface regions along their lengths, and stressing the composite sufficiently to locally strain the matrix near the discrete regions whereby the matrix in the space between the members is substantially and selectively though nonuniformly strain-hardened and strengthened and whereby spheres of influence induced by the straining and strain-hardening in the matrix within the space near the discrete regions on one member are caused to significantly overlap similar spheres of influence near the neighboring members.

19. The method of claim 1 wherein the dispersing step comprises orienting the members generally in the direction of the intended principal tensile loading on the composite when in use, and the stressing step comprises subjecting the composite to an external load in substantially the same direction.

20. The method of claim 1 including adjusting the volume percentage of the reinforcing members in the composite relative to the ultimate tensile strengths of the matrix and of the reinforcing members to insure substantially equal failure rates in the members and in the matrix thereby achieving optimal composite strength.

21. The method of claim 1 wherein the preparing step comprises forming discontinuous reinforcing members and the dispersing step comprises aligning the discontinuous members to within 3° relative to one another.

22. The method of claim 1 wherein the matrix is selected from the group consisting of aluminum, magnesium, titanium, beryllium, iron, copper, silver, molybdenum, and nickel; and the reinforcing members are selected from the group consisting of boron, beryllium, graphite, sapphire, silicon carbide, boron carbide, and stainless steel.

23. The method of claim 1 wherein at least one of the preparing and dispersing steps is done with the members in vertical positions to eliminate gravity-induced, processing non-uniformity results.

24. The method of claim 1 wherein the preparing step includes applying a metallic cushioning layer of substantial thickness to the surface of the members to increase the resistance of the members to transverse and dynamic stresses and strains.

25. The method of claim 1 including mechanically working the composite to achieve at least 40 percent of the allowable straining and strain-hardening in the matrix without the failure thereof.

26. The method of claim 25 wherein the mechanical working step is done at a rate sufficiently fast relative to the heat dissipation rate in the composite so that substantial chemical bonding occurs from the relatively confined heat generated from the plastic deformation of the matrix through the mechanical work.

27. The method of claim 6 including periodically varying the growth conditions so as to form protrusions periodically along the length of the reinforcing members.

28. The method of claim 27 including adding to the melt a bond-modifying, melt-segregatable chemical; and causing the chemical to segregate periodically onto preselected surface portions of the reinforcing members in response to the periodical variations in the growth conditions.

29. The method of claim 18 wherein the effective bonding is done by chemical means and including forming controlled and uniformly shaped, substantially strain-hardened zones of continually increasing strain intensity toward the chemically bonded, discrete surface regions on the members.

30. The method of claim 18 wherein the reinforcing members are discontinuous members and the dispersing step includes aligning the members to within 3° of one another.

31. The method of claim 18 including forming substantial lateral protrusions on the members to provide bearing areas thereat so that the load transfer between the members is not limited to interfacial shears that tend to break the matrix-member interfacial bonds, but is also through the much stronger compression of the matrix pressing against the protrusions on the members.

32. The method of claim 31 wherein the bonding step comprises limiting the chemical bonding of the matrix to only the protrusions on the members.

33. The method of claim 31 wherein the forming and dispersing steps comprise zigzagging the formed protrusions from one member to its immediate neighbors, and including oppositely compressing and shearing the zigzagged protrusions on the nearby members.

34. The method of claim 18 wherein the stressing step comprises gradually and increasingly strain-hardening the matrix at the individual discrete regions, and causing selective matrix yielding away from the discrete regions to self-regulate the stress distribution until all the discrete regions are assuming substantially equal shares of the external load on the composite.

35. The method for reducing mismatch stresses and strains between elongated, high-strength and high-modulus reinforcing members and the surrounding metal matrix in a composite of the type wherein the matrix is strain-hardenable and the reinforcing members substantially mismatch the matrix in thermophysical properties, comprising: dispersing in the matrix the reinforcing members according to a prespecified, regular and symmetrical geometrical pattern so as to have substantially uniform spacing between the members and to orient the members generally in the direction of the intended principle tensile loading on the composite when in use; effectively chemically bonding the matrix to selected surface regions of the members along the lengths thereof but imperfectly chemically bonding the matrix to the regions intermediate these selected regions, the selected regions zigzagging from one member to its neighbors along the direction; and stressing the composite in the direction sufficiently to develop controlled and uniformly shaped, substantially strain-hardened zones of continually increasing strain intensity toward the selected regions yet to leave the matrix between the strain-hardened zones in relatively soft and less strained conditions to allow therein substantial matrix yielding for the absorption of the mismatch stresses.

36. The method of claim 35 wherein the reinforcing members are fibers and the geometrical pattern consists of a hexagonal arrangement in which each fiber has six equally distant, closest neighbors.

37. The method of claim 35 wherein the members are discontinuous members and the dispersing step includes aligning the members to within 3° of one another.

38. The method of claim 35 including forming protrusions on the members and centering the selected regions on the protrusions.

* * * * *